(12) United States Patent
Jung et al.

(10) Patent No.: US 10,457,119 B2
(45) Date of Patent: Oct. 29, 2019

(54) AIR CONDITIONING SYSTEM FOR MOTOR VEHICLES

(71) Applicant: Halla Visteon Climate Control Corp., Daejeon (KR)

(72) Inventors: Hong Rae Jung, Daejeon (KR); Se Won Min, Daejeon (KR); Sang Jun Yoo, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 1209 days.

(21) Appl. No.: 14/707,285

(22) Filed: May 8, 2015

(65) Prior Publication Data
US 2015/0321536 A1 Nov. 12, 2015

(30) Foreign Application Priority Data

May 9, 2014 (KR) .................. 10-2014-0055514
Apr. 30, 2015 (KR) .................. 10-2015-0061007

(51) Int. Cl.
*B60H 1/22* (2006.01)
*F24H 9/18* (2006.01)
*F24H 3/04* (2006.01)

(52) U.S. Cl.
CPC ......... *B60H 1/2218* (2013.01); *F24H 3/0429* (2013.01); *F24H 9/1872* (2013.01); *B60H 2001/225* (2013.01); *B60H 2001/2265* (2013.01)

(58) Field of Classification Search
CPC ... F24H 3/0429; F24H 9/1872; B60H 1/2225; B60H 1/2218; B60H 1/00735
See application file for complete search history.

(56) References Cited

U.S. PATENT DOCUMENTS

| 2008/0002326 A1* | 1/2008 | Watanabe | B60H 1/2218 361/103 |
| 2011/0220636 A1* | 9/2011 | Hendricks | H05B 1/0252 219/494 |
| 2014/0117104 A1* | 5/2014 | Inaba | B60H 1/00899 237/28 |
| 2016/0046174 A1* | 2/2016 | Sagou | H05B 1/0236 392/375 |

FOREIGN PATENT DOCUMENTS

KR    20120047084 A  *  5/2012

* cited by examiner

*Primary Examiner* — Jianying C Atkisson
*Assistant Examiner* — Meraj A Shaikh
(74) *Attorney, Agent, or Firm* — Shumaker, Loop & Kendrick, LLP; James D. Miller (57) ABSTRACT

An air conditioning system for motor vehicles includes a blower configured to blow an air into a vehicle room, a PTC heater configured to heat the air blown into the vehicle room, the PTC heater having a heat generation amount adjusted by PWM duty ratio control, a blower air volume change amount measurement unit configured to, when an air volume of the blower is changed, measure a blower air volume change amount per unit time during a predetermined time period from a time point at which the air volume of the blower is changed, and a control unit configured to, when the air volume of the blower is changed, correct a PWM duty ratio of the PTC heater in view of the blower air volume change amount per unit time measured by the blower air volume change amount measurement unit.

13 Claims, 4 Drawing Sheets

AIR CONDITIONING SYSTEM FOR MOTOR VEHICLES

CROSS-REFERENCE TO RELATED APPLICATIONS

This application claims priority to Korean Patent Application No. 10-2014-0055514 filed May 9, 2014 and Korean Patent Application No. 10-2015-0061007 filed Apr. 30, 2015, hereby incorporated herein by reference in their entirety.

FIELD OF THE INVENTION

The present invention relates to an air conditioning system for motor vehicles and, more particularly, to an air conditioning system for motor vehicles capable of increasing the control speed of a heating temperature of a PTC heater and consequently improving the rapidity of control of a vehicle room temperature, by employing a configuration in which the heat generation amount of the PTC heater can be rapidly corrected when the heat generation amount of the PTC heater is changed depending on the change in the air volume of a blower.

BACKGROUND ART

In a hybrid vehicle or an electric vehicle, an engine is limitedly used or not used. Thus, engine cooling water required for heating a vehicle room may be insufficient or may not be obtained.

Accordingly, an air conditioning system for a hybrid vehicle or an electric vehicle (hereinafter generally referred to as a "motor vehicle") employs a heating device capable of heating a vehicle room without engine cooling water. As one example, there is available a heating device that makes use of a positive temperature coefficient (PTC) heater.

Figure 1:
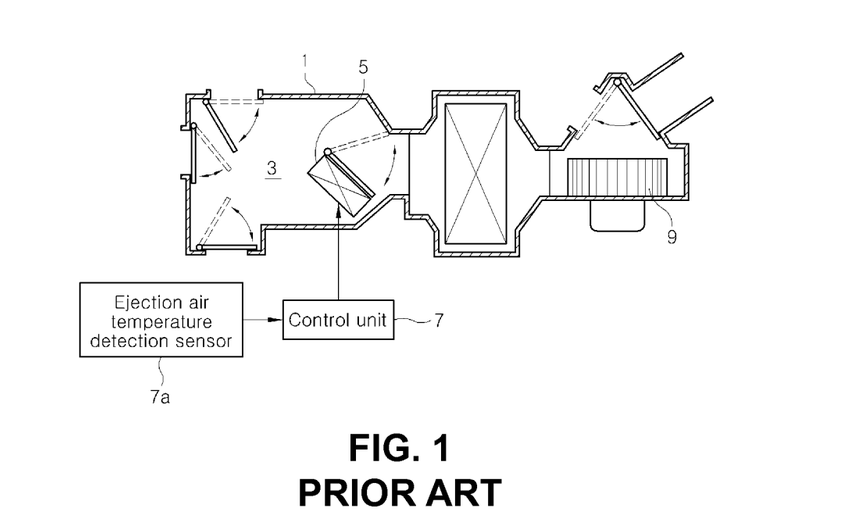
FIG. 1 is a view showing a conventional air conditioning system for motor vehicles.

As shown in FIG. 1, the heating device using the PTC heater includes a PTC heater 5 installed in an internal path 3 of an air conditioner case 1 and a control unit 7 configured to control the PTC heater 5. The PTC heater 5 is a high-voltage heater, the heat generation amount of which is adjusted by the control of a pulse width modulation (PWM) duty ratio. The PTC heater 5 heats the air blown into a vehicle room, thereby heating the vehicle room.

In a heating mode, the control unit 7 sets a target heating temperature based on an ejection air temperature of a vehicle room inputted from an ejection air temperature detection sensor 7a and applies a PWM duty ratio corresponding to the target heating temperature to the PTC heater 5, thereby controlling the heat generation amount of the FTC heater 5. Thus, the PTC heater 5 is controlled in conformity with the target heating temperature.

If the temperature and volume of the air introduced into the air conditioner case 1 is changed and if the ejection air temperature of the vehicle room is changed, the control unit 7 detects the changed ejection air temperature with the ejection air temperature detection sensor 7a and resets the target heating temperature based on the detected ejection air temperature.

The PWM duty ratio corresponding to the reset target heating temperature is re-applied to the PTC heater 5 to control the heat generation amount of the PTC heater 5, whereby the heat generation amount of the PTC heater 5 is controlled in conformity with the reset target heating temperature.

In the conventional air conditioning system mentioned above, the target heating temperature of the PTC heater 5 is set based on the ejection air temperature of the vehicle room. Thus, the target heating temperature is reset only when the ejection air temperature of the vehicle room undergoes a change.

There may be a case where the volume and temperature of the air passing through the PTC heater 5 is abruptly changed. For example, there may be a case where the volume of the air passing through the PTC heater 5 is changed by the rotation speed level of a blower 9 being changed by a user. In this case, the target heating temperature is not immediately reset even if the heating temperature of the PTC heater 5 is abruptly changed. The target heating temperature is reset only when the ejection air temperature of the vehicle room shows a change.

Thus, the time of resetting the target heating temperature in response to the change of the heating temperature of the PTC heater 5 is delayed. This may delay the control of the heating temperature of the FTC heater 5 and may impair the rapidity of control of the vehicle room temperature.

Figure 2:
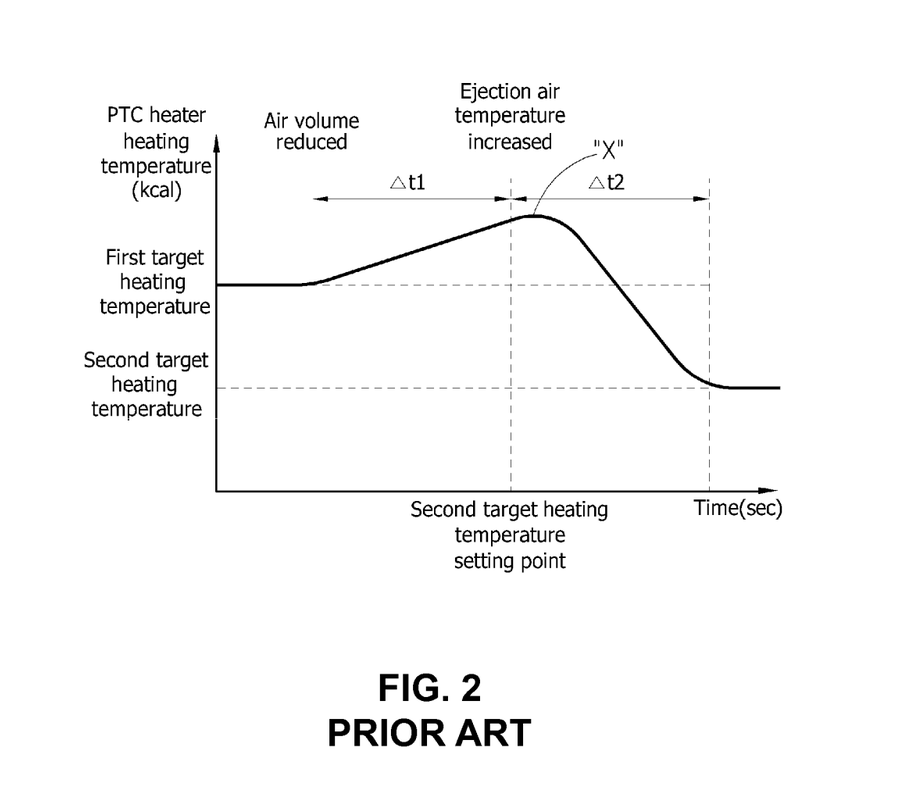
FIG. 2 is a graph illustrating an operation example of the conventional air conditioning system, in which graph there is illustrated the relationship between the heating temperature of a PTC heater, the ejection air temperature of a vehicle room and the target heating temperature of the PTC heater when the air volume of a blower is reduced.

More specifically, as shown in FIGS. 1 and 2, if the volume of the air passing through the PTC heater 5 is reduced as the rotation speed level of the blower 9 is lowered by a user, the heating temperature of the PTC heater 5 controlled in conformity with a first target heating temperature is abruptly increased. Despite the abrupt increase of the heating temperature of the PTC heater 5, a second target heating temperature is not immediately set. Thus, the resetting of the second target heating temperature is delayed. After a specified time ($\Delta t1$) is elapsed, the second target heating temperature is set at the time point when the ejection air temperature of the vehicle room is increased. This poses a problem in that the time of resenting the target heating temperature in response to the change of the heating temperature of the PTC heater 5 is delayed.

This may delay the control of the heating temperature of the PTC heater 5 and may consequently impair the rapidity of control of the vehicle room temperature. As a result, the comfort within the vehicle room is reduced.

Even if the second target heating temperature is set, the heating temperature of the PTC heater 5 continues to increase due to the thermal inertia (see "X" in FIG. 2). Owing to this temperature rise, a long period of time ($\Delta t2$) is required for the heating temperature of the PTC heater 5 to reach the second target heating temperature.

As a result, it becomes difficult to control the heating temperature of the PTC heater 5. Consequently, a large amount of air having an undesired temperature is blown into the vehicle room, thereby making the vehicle room unpleasant.

SUMMARY OF THE INVENTION

In view of the above-noted problems, it is an object of the present invention to provide an air conditioning system for motor vehicles which can rapidly reset a target heating temperature when the air volume of a blower is changed to affect the heating temperature of a PTC heater.

Another object of the present invention is to provide an air conditioning system for motor vehicles capable of immediately coping with the change in the air volume of a blower and the resultant change in the heating temperature of a PTC heater, by employing a configuration in which the target heating temperature can be rapidly reset in response to the change in the air volume of a blower.

A further object of the present invention is to provide an air conditioning system for motor vehicles capable of increasing the control speed of the heating temperature of a PTC heater and consequently improving the rapidity of control of a vehicle room temperature, by employing a configuration in which the air conditioning system can immediately cope with the change in the air volume of a blower and the resultant change in the heating temperature of a PTC heater.

A still further object of the present invention is to provide an air conditioning system for motor vehicles capable of improving the comfort within a vehicle room, by employing a configuration in which the rapidity of control of a vehicle room temperature can be improved.

A yet still further object of the present invention is to provide an air conditioning system for motor vehicles capable of accurately controlling the heating temperature of a PTC heater and significantly improving the comfort within a vehicle room, by employing a configuration in which the target heating temperature is reset in view of the temperature of the air as well as the air volume of a blower affecting the heating temperature of the PTC heater.

In one aspect of the present invention, there is provided an air conditioning system for motor vehicles, including: a blower configured to blow an air into a vehicle room; a PTC heater configured to heat the air blown into the vehicle room, the PTC heater having a heat generation amount adjusted by PWM duty ratio control; a blower air volume change amount measurement unit configured to, when an air volume of the blower is changed, measure a blower air volume change amount per unit time during a predetermined time period from a time point at which the air volume of the blower is changed; and a control unit configured to, when the air volume of the blower is changed, correct a PWM duty ratio of the PTC beater in view of the blower air volume change amount per unit time measured by the blower air volume change amount measurement unit.

The control unit may be configured to, when the air volume of the blower is changed, correct the PWM duty ratio of the PTC heater in view of the blower air volume change amount per unit time measured by the blower air volume change amount measurement unit and an air temperature of the air blown from the blower.

The control unit may be configured to store a PWM duty ratio compensation value (B) corresponding to the blower air volume change amount per unit time and a PWM duty ratio weight value (C) corresponding to the air temperature, and the control unit may be configured to, when the air volume of the blower is changed, detect the PWM duty ratio compensation value (B) and the PWM duty ratio weight value (C), calculate a PWM duty ratio correction value (A) from the PWM duty ratio compensation value (B) and the PWM duty ratio weight value (C) using the following pre-stored equation [1]: PWM duty ratio correction value (A)=PWM duty ratio compensation value (B) corresponding to blower air volume change amount per unit time×PWM duty ratio weight value (C) corresponding to air temperature, and correct the PWM duty ratio of the PTC heater using the PWM duty ratio correction value (A).

According to the air conditioning system for motor vehicles, if the air volume of the blower is changed, the PWM duty ratio correction value of the PTC heater is immediately calculated and the heat generation amount of the PTC heater is rapidly corrected using the calculated PWM duty ratio correction value. It is therefore possible to rapidly cope with the abrupt change in the heat generation amount of the PTC heater caused by the change in the air volume of the blower.

Since it is possible to rapidly cope with the abrupt change in the heat generation amount of the PTC heater caused by the change in the air volume of the blower, the heat generation amount of the PTC heater can be controlled in an optimal state before the ejection air temperature of the vehicle room is changed by the abrupt change in the heat generation amount of the PTC heater.

Since the heat generation amount of the PTC heater can be controlled in an optimal state before the ejection air temperature of the vehicle room is changed, it is possible to keep constant the ejection air temperature of the vehicle room regardless of the change in the air volume of the blower and the resultant change in the heat generation amount of the PTC heater.

Since the heat generation amount of the PTC heater can be controlled in an optimal state before the ejection air temperature of the vehicle room is changed, unlike the prior art in which the heat generation amount of the PTC heater is controlled after the ejection air temperature of the vehicle room is changed, it is possible to significantly increase the control speed of the heat generation amount of the FTC heater and to sharply shorten the time required in controlling the heat generation amount of the PTC heater.

Since the time required in controlling the heat generation amount of the PTC heater can be sharply shortened, it is possible to significantly improve the rapidity of control of the vehicle room temperature.

Since the heat generation amount of the PTC heater is controlled in view of the air temperature as well as the change in the air volume of the blower, it is possible to accurately control the heat generation temperature of the PTC heater and to greatly improve the comfort within the vehicle room.

BRIEF DESCRIPTION OF THE DRAWINGS

The above and other objects and features of the present invention will become apparent from the following description of preferred embodiments given in conjunction with the accompanying drawings.

DETAILED DESCRIPTION OF THE PREFERRED EMBODIMENTS

Some preferred embodiments of an air conditioning system for motor vehicles according to the present invention will now be described in detail with reference to the accompanying drawings. Components similar to those of the prior art described earlier will be designated by like reference symbols.

First Embodiment

Prior to describing features of an air conditioning system for motor vehicles according to the present invention, a PTC heater device will be briefly described with reference to FIG. 3.

The PTC heater device includes a PTC heater 5 installed in an internal path 3 of an air conditioner case 1 and a control unit 7 configured to control the PTC heater 5. The control unit 7 is a controller responsible for controlling operation of the PTC heater device. The PTC heater 5 is a high-voltage heater, the heat generation amount of which is adjusted by the control of a pulse width modulation (PWM) duty ratio. The PTC heater 5 heats the air blown into a vehicle room, thereby heating the vehicle room.

In a heating mode, the control unit 7 sets a target heating temperature based on an ejection air temperature of a vehicle room inputted from an ejection air temperature detection sensor 7a and applies a PWM duty ratio corresponding to the target heating temperature to the PTC heater 5, thereby controlling the heat generation amount of the PTC heater 5. Thus, the PTC heater 5 is controlled in conformity with the target heating temperature.

Next, the features of the air conditioning system according to the present invention will be described in detail with reference to FIGS. 3 and 6.

Figure 3:
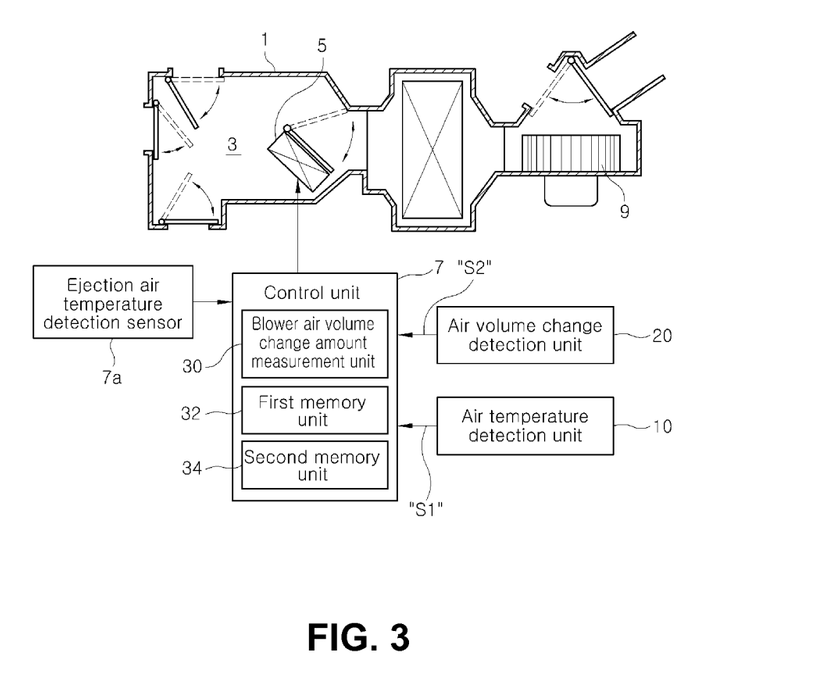
FIG. 3 is a view showing the configuration of an air conditioning system for motor vehicles according to the present invention.

Referring first to FIG. 3, the air conditioning system according to the present invention includes an air temperature detection unit 10 configured to detect a temperature of an air introduced into the air conditioner case 1 and an air volume change detection unit 20 configured to detect a change in a volume of an air blown from a blower 9.

The air temperature detection unit 10 is formed of, e.g., a temperature sensor. The air temperature detection unit 10 detects the temperature of the air introduced into the air conditioner case 1 and inputs the data on the detected air temperature S1 to the control unit 7.

The air volume change detection unit 20 is formed of an air volume adjustment switch (not shown) for adjusting a rotation speed level of the blower 9. If a user manually operates the air volume adjustment switch to adjust the rotation speed level of the blower 9, the air volume adjustment switch outputs an air volume control signal S2 and adjusts a voltage applied to the blower 9, thereby adjusting the rotation speed level of the blower 9. By outputting the air volume control signal S2, the air volume adjustment switch enables the control unit 7 to detect a change in the air volume of the blower 9.

The air volume change detection unit 20 includes an auto mode switch (not shown) for controlling the blower 9 in an auto mode and a preset temperature adjustment switch (not shown) for adjusting a preset temperature of a vehicle room.

If a user operates the auto mode switch to control the blower 9 in the auto mode, the auto mode switch outputs the air volume control signal S2. The auto mode switch enables the control unit 7 to detect a change in the rotation speed level of the blower 9 and a change in the air volume of the blower 9 when the operation mode of the blower 9 is changed from the manual mode to the auto mode.

If the user operates the preset temperature adjustment switch to adjust the preset temperature of the vehicle room, the preset temperature adjustment switch outputs the air volume control signal S2. The preset temperature adjustment switch enables the control unit 7 to detect a change in the rotation speed level of the blower 9 and a change in the air volume of the blower 9 when the preset temperature of the vehicle room is changed while the blower 9 is controlled in the auto mode.

The control unit 7 of the air conditioning system according to the present invention includes a blower air volume change amount measurement unit 30, a first memory unit 32 and a second memory unit 34.

If the air volume control signal S2 is inputted from the air volume change detection unit 20, the blower air volume change amount measurement unit 30 recognizes the change in the air volume of the blower 9. In this case, the blower air volume change amount measurement unit 30 measures a blower air volume change amount per unit time during a predetermined time period from the time point at which the air volume of the blower 9 is changed, namely the time point at which the air volume control signal S2 is inputted.

For example, if the air volume control signal S2 is inputted from the air volume change detection unit 20, the blower air volume change amount measurement unit 30 measures a change amount of the air volume of the blower 9 during a predetermined time period of, e.g., about 0.5 to 2 seconds (hereinafter referred to as a "preset time") from the time point at which the air volume control signal S2 is inputted. In this way, the blower air volume change amount measurement unit 30 measures a blower air volume change amount per unit time.

The blower air volume change amount measurement unit 30 is configured to measure a difference between the voltage applied to the blower 9 at the time point at which the air volume control signal S2 is inputted and the voltage applied to the blower 9 after the preset time is elapsed. The blower air volume change amount measurement unit 30 measures an air volume change amount of the blower 9 based on the voltage difference thus measured.

The first memory unit 32 stores PWM duty ratio compensation values associated with blower air volume change amounts per unit time. The second memory unit 34 stores PWM duty ratio weight values associated with air temperatures.

If the air volume control signal S2 is inputted from the air volume change detection unit 20, the control unit 7 determines that the air volume of the blower 9 is currently changed and the heat generation amount of the PTC heater 5 is currently changed.

Upon making such determination, the control unit 7 enters a heater precedent control mode. In the heater precedent control mode, the control unit 7 detects, from the first memory unit 32 and the second memory unit 34, the PWM duty ratio compensation value corresponding to the blower air volume change amount per unit time measured in the blower air volume change amount measurement unit 30 and the PWM duty ratio weight value corresponding to the air temperature inputted from the air temperature detection unit 10.

If the PWM duty ratio compensation value corresponding to the blower air volume change amount per unit time and the PWM duty ratio weight value corresponding to the air temperature are detected, the control unit 7 calculates a PWM duty ratio correction value (A) using the following pre-stored equation [1]:

PWM duty ratio correction value (A) PWM duty ratio compensation value (B) corresponding to blower air volume change amount per unit time×PWM duty ratio weight value (C) corresponding to air temperature.

If the calculation of the PWM duty ratio correction value (A) is completed, the control unit 7 applies the calculated PWM duty ratio correction value (A) to the PTC heater 5 and corrects the heat generation amount of the PTC heater 5.

Accordingly, it is possible to rapidly cope with the abrupt change in the heat generation amount of the PTC heater 5 caused by the change in the air volume of the blower 9. This makes it possible to appropriately control the heat generation amount of the PTC heater 5.

Thus, the heat generation amount of the PTC heater 5 can be controlled in an optimal state before the ejection air temperature of the vehicle room is changed by the abrupt change in the heat generation amount of the PTC heater 5.

As a result, regardless of the change in the air volume of the blower 9 and the resultant change in the heat generation amount of the PTC heater 5, the ejection air temperature of the vehicle room can be kept substantially constant with no large change. This helps improve the comfort within the vehicle room.

In addition, since the heat generation amount of the PTC heater 5 can be controlled in an optimal state before the ejection air temperature of the vehicle room is changed, unlike the prior art in which the heat generation amount of the PTC heater 5 is controlled only after the ejection air temperature of the vehicle room is changed, it is possible to significantly increase the control speed of the heat generation amount of the PTC heater 5.

Accordingly, as compared with the prior art, it is possible to sharply reduce the time required in controlling the heat generation amount of the PTC heater 5. This makes it possible to improve the rapidity of control of the vehicle room temperature. Since the heat generation amount of the PTC heater 5 is controlled in view of the air temperature as well as the change in the air volume of the blower 9, it is possible to accurately control the heat generation temperature of the PTC heater 5 and to greatly improve the comfort within the vehicle room.

The first memory unit 32 of the control unit 7 stores the PWM duty ratio compensation values in association with the blower air volume change amounts per unit time. The PWM duty ratio compensation values associated with the blower air volume change amounts per unit time may be obtained by conducting experiments several times.

The PWM duty ratio compensation values against the blower air volume change amounts per unit time, which are stored in the first memory unit 32, are differently set depending on the condition when the air volume of the blower 9 is reduced and the condition when the air volume of the blower 9 is increased.

For example, it may be possible to differently set the PWM duty ratio compensation values against the blower air volume change amounts (reducing amounts) per unit time under the condition that the air volume level of the blower 9 is reduced from an eighth level to a first level and the PWM duty ratio compensation values against the blower air volume change amounts (increasing amounts) per unit time under the condition that the air volume level of the blower 9 is increased from the first level to the eighth level.

Under the condition that the air volume of the blower 9 is reduced, it is preferred that the PWM duty ratio compensation values corresponding to the blower air volume change amounts per unit time stored in the first memory unit 32 grow gradually larger as the blower air volume change amounts (reducing amounts) per unit time become larger.

For example, it is preferred that the PWM duty ratio compensation value available when the air volume level of the blower 9 is changed from the eighth level to the first level is set to become larger than the PWM duty ratio compensation value available when the air volume level of the blower 9 is changed from the eighth level to a second level.

The reason is as follows. Under the condition that the air volume of the blower 9 is reduced, the air volume passing through the PTC heater 5 is gradually reduced in reverse proportion to the increase of the blower air volume change amount (reducing amount) per unit time. The heating temperature of the PTC heater 5 is gradually increased in proportion to the increase of the blower air volume change amount (reducing amount) per unit time.

Therefore, under the condition that the air volume of the blower 9 is reduced, the PWM duty ratio compensation values are set to become gradually larger in proportion to the blower air volume change amounts (reducing amounts) per unit time. By doing so, the PWM duty ratio correction value (A) calculated by the equation [1] becomes gradually larger in proportion to the blower air volume change amount (reducing amount) per unit time. Thus, the PWM duty ratio correction value (A) for the PTC heater 5 becomes larger in proportion to the increase of the blower air volume change amount (reducing amount) per unit time. This makes it possible to cope with the sharp increase of the heating temperature of the FTC heater 5.

Similarly, under the condition that the air volume of the blower 9 is increased, it is preferred that the PWM duty ratio compensation values corresponding to the blower air volume change amounts per unit time stored in the first memory unit 32 grow gradually larger as the blower air volume change amounts (increasing amounts) per unit time become larger.

For example, it is preferred that the PWM duty ratio compensation value available when the air volume level of the blower 9 is changed from the first level to the eighth level is set to become larger than the PWM duty ratio compensation value available when the air volume level of the blower 9 is changed from the first level to a seventh level.

The reason is as follows. Under the condition that the air volume of the blower 9 is increased, the air volume passing through the PTC heater 5 is gradually increased in proportion to the increase of the blower air volume change amount (increasing amount) per unit time. The heating temperature of the PTC heater 5 is gradually reduced in proportion to the increase of the blower air volume change amount (increasing amount) per unit time.

Therefore, under the condition that the air volume of the blower 9 is increased, the PWM duty ratio compensation values are set to become gradually larger in proportion to the blower air volume change amounts (increasing amounts) per unit time. By doing so, the PWM duty ratio correction value (A) calculated by the equation [1] becomes gradually larger in proportion to the increase of the blower air volume change amount (increasing amount) per unit time. Thus, the PWM duty ratio correction value (A) for the PTC heater 5 becomes larger in proportion to the blower air volume change amount (increasing amount) per unit time. This makes it possible to cope with the sharp reduction of the heating temperature of the PTC heater 5.

The second memory unit 34 of the control unit 7 stores the PWM duty ratio weight values in association with the air temperatures. The PWM duty ratio weight values associated with the air temperatures may be obtained by conducting experiments several times.

In this case, it is preferred that the PWM duty ratio weight values against the air temperatures stored in the second memory unit 34 are set to become gradually larger in reverse proportion to the air temperatures.

The reason is as follows. The temperature reduction of the PTC heater 5 becomes severe as the air temperature of the air introduced into air conditioner case 1 grows lower. By setting the PWM duty ratio weight values so as to become gradually larger in reverse proportion to the reduction of the air temperatures, the PWM duty ratio correction value (A) calculated by the equation [1] becomes gradually larger as the air temperature of the air introduced into air conditioner case 1 grows lower. If the PWM duty ratio correction value (A) for the PTC heater 5 is allowed to become larger as the air temperature of the air introduced into air conditioner case 1 grows lower, it is possible to cope with the reduction of the heating temperature of the PTC heater 5.

Referring again to FIG. 3, if a predetermined time period is elapsed in the state in which the PTC heater 5 is controlled by the PWM duty ratio correction value (A) calculated using the equation [1], the control unit 7 determines that the control unit 7 has appropriately coped with the change in the heat generation amount of the PTC heater 5 caused by the change in the air volume of the blower 9.

Upon making such determination, the control unit 7 is released from the heater precedent control mode and is returned to the original auto mode. In the auto mode, the control unit 7 sets the target heating temperature depending on the ejection air temperature of the vehicle room inputted from the ejection air temperature detection sensor 7a and applies the PWM duty ratio corresponding to the target heating temperature to the FTC heater 5, thereby controlling the heat generation amount of the PTC heater 5. Thus, the PTC heater 5 is controlled in conformity with the target heating temperature.

Next, an operation example of the air conditioning system configured as above will be described in detail with reference to FIGS. 3 to 6.

Figure 4:
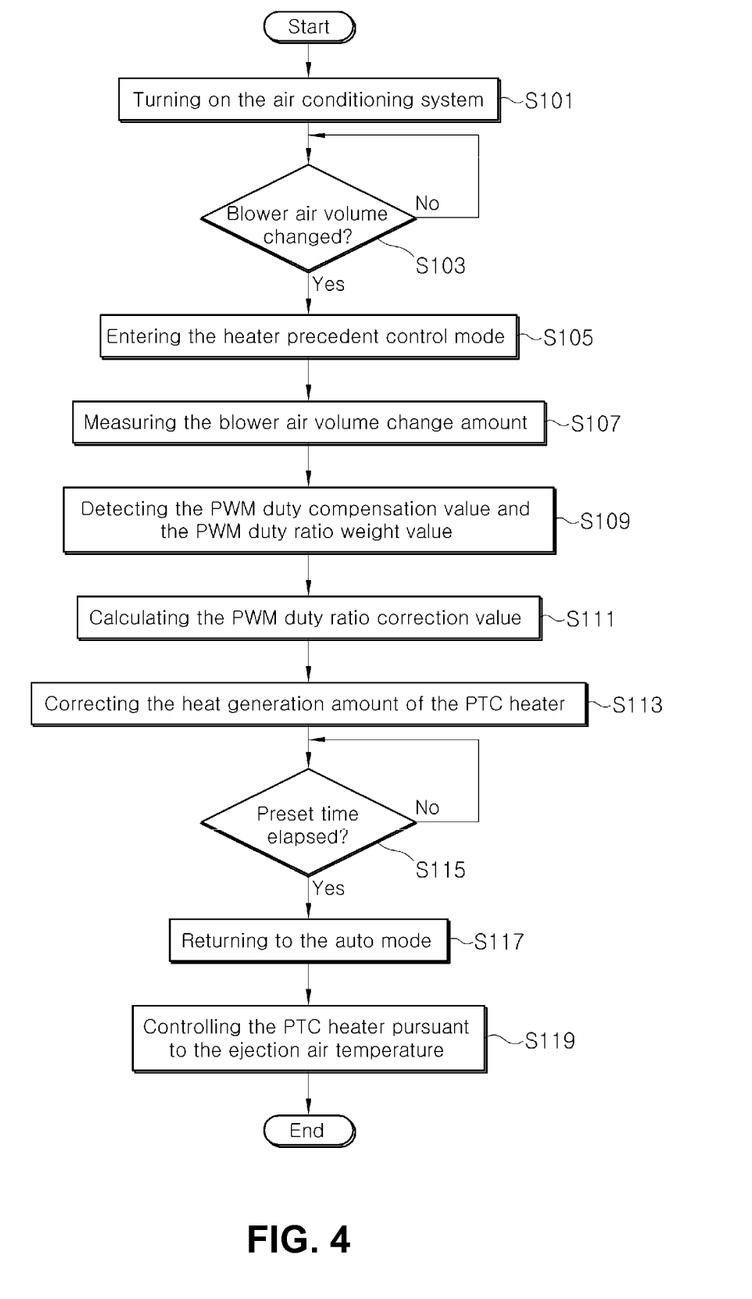
FIG. 4 is a flowchart illustrating an operation example of the air conditioning system for motor vehicles according to the present invention.

Referring first to FIG. 4, the air conditioning system is turned on (at S101). In this state, determination is made as to whether the air volume of the blower 9 is changed (at S103). If it is determined that the air volume of the blower 9 is changed, the control unit 7 enters the heater precedent control mode (at S105). In the heater precedent control mode, the control unit 7 measures the blower air volume change amount per unit time (at S107).

If the measurement of the blower air volume change amount per unit time is completed, the control unit 7 detects, from the first memory unit 32 and the second memory unit 34, the PWM duty ratio compensation value (B) corresponding to the blower air volume change amount per unit time and the PWM duty ratio weight value (C) corresponding to the air temperature (at S109).

If the detection of the PWM duty ratio compensation value (B) and the PWM duty ratio weight value (C) is completed, the control unit 7 calculates the PWM duty ratio correction value (A) using the pre-stored equation [1] (at S111).

If the calculation of the PWM duty ratio correction value (A) is completed, the control unit 7 applies the calculated PWM duty ratio correction value (A) to the PTC heater 5 and corrects the heat generation amount of the PTC heater 5 (at S113). By doing so, it is possible to rapidly cope with the abrupt change of the heat generation amount of the PTC heater 5 caused by the change in the air volume of the blower 9 and to appropriately control the heat generation amount of the PTC heater 5.

Figure 5:
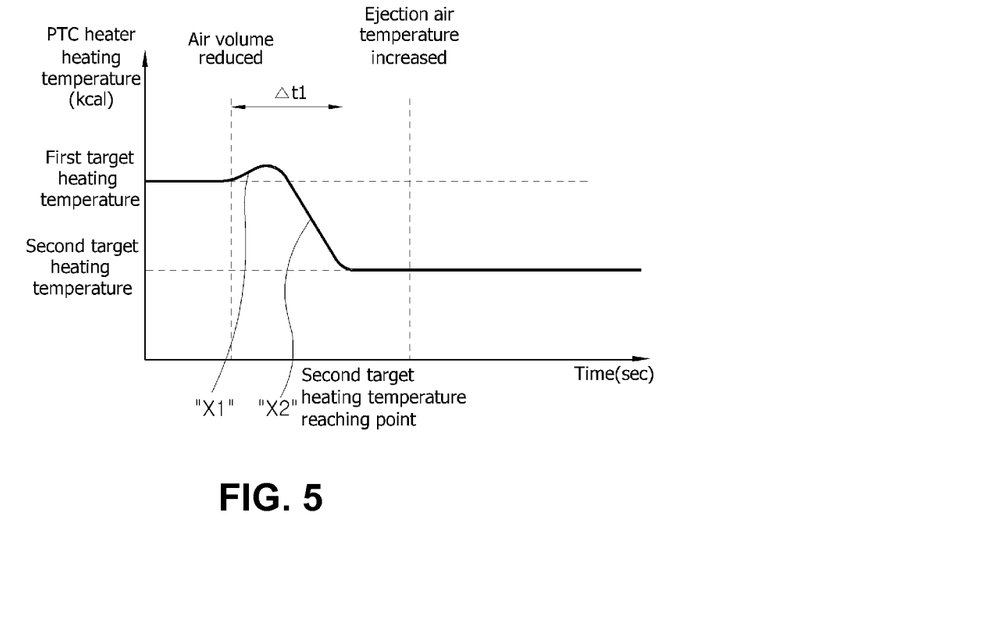
FIG. 5 is a graph illustrating an operation example of the air conditioning system according to the present invention, in which graph there is illustrated the relationship between the heating temperature of a PTC heater, the ejection air temperature of a vehicle room and the target heating temperature of the PTC heater when the air volume of a blower is reduced.

For example, as shown in FIG. 5, if the air volume of the blower 9 is reduced by the user and if the volume of the air passing through the PTC heater 5 is reduced, the heating temperature of the PTC heater 5 controlled in conformity with the first target heating temperature is abruptly increased (X1 in FIG. 5). In response to the reduction of the air volume of the blower 9, the control unit 7 immediately calculates the PWM duty ratio correction value (A) using the equation [1]. Based on the PWM duty ratio correction value (A) thus calculated, the control unit 7 controls the heating temperature of the PTC heater 5 in conformity with the second target heating temperature.

Then the heating temperature of the PTC heater 5 is gradually reduced (X2) to the second target heating temperature. Accordingly, the time ($\Delta t1$) required in controlling the heat generation amount of the PTC heater 5 in response to the change in the air volume of the blower 9 is sharply reduced. It is therefore possible to control the heat generation amount of the PTC heater 5 in conformity with the second target heating temperature before the ejection air temperature of the vehicle room is changed. As a result, it is possible to positively cope with the change in the air volume of the blower 9 without changing the ejection air temperature of the vehicle room, whereby the comfort within the vehicle room is improved.

Figure 6:
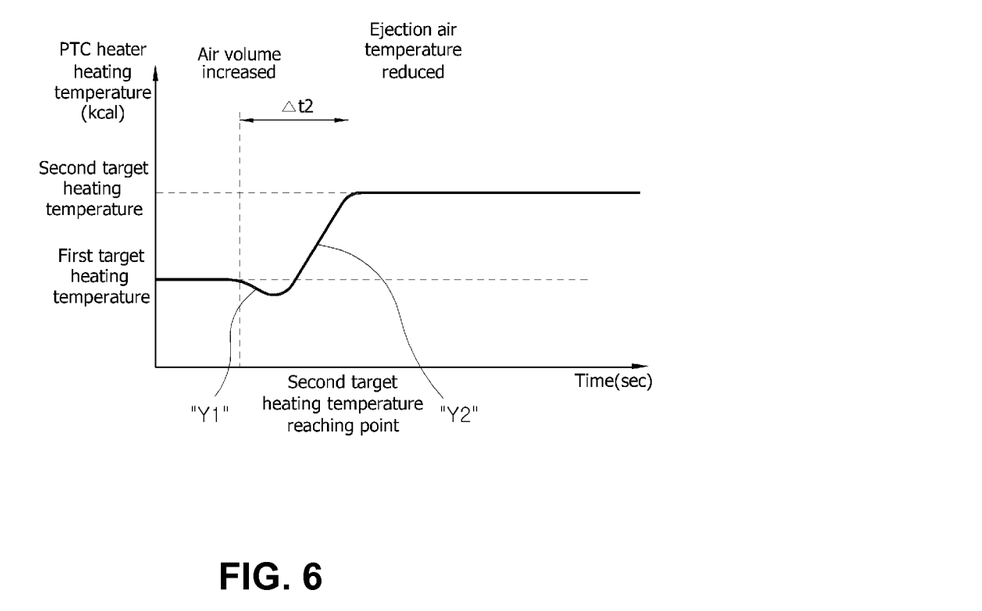
FIG. 6 is a graph illustrating an operation example of the air conditioning system according to the present invention, in which graph there is illustrated the relationship between the heating temperature of a PTC heater, the ejection air temperature of a vehicle room and the target heating temperature of the PTC heater when the air volume of a blower is increased.

Conversely, if the air volume of the blower 9 is increased by the user and if the volume of the air passing through the PTC heater 5 is increased, the heating temperature of the PTC heater 5 controlled in conformity with the first target heating temperature is abruptly reduced (Y1 in FIG. 6). In response to the increase of the air volume of the blower 9, the control unit 7 immediately calculates the PWM duty ratio correction value (A) using the equation [1]. Based on the PWM duty ratio correction value (A) thus calculated, the control unit 7 controls the heating temperature of the PTC heater 5 in conformity with the second target heating temperature.

Then the heating temperature of the PTC heater 5 is gradually increased (Y2) to the second target heating temperature. Accordingly, the time ($\Delta t2$) required in controlling the heat generation amount of the PTC heater 5 in response to the change in the air volume of the blower 9 is sharply reduced. It is therefore possible to control the heat generation amount of the PTC heater 5 in conformity with the second target heating temperature before the ejection air temperature of the vehicle room is changed. As a result, it is possible to positively cope with the change in the air volume of the blower 9 without changing the ejection air temperature of the vehicle room, whereby the comfort within the vehicle room is improved.

Referring again to FIG. 4, under the condition that the heat generation amount of the PTC heater 5 is corrected pursuant to the PWM duty ratio correction value (A), the control unit 7 determines whether a preset time is elapsed (at S115).

If it is determined that the preset time is elapsed, the control unit 7 is released from the heater precedent control mode and is returned to the original auto mode (at S117). In the auto mode, the control unit 7 controls the PWM duty ratio of the PTC heater 5 pursuant to the ejection air temperature of the vehicle room inputted from the ejection air temperature detection sensor 7a, thereby controlling the heat generation amount of the PTC heater 5 (at S119)

According to the air conditioning system configured as above, if the air volume of the blower 9 is changed, the PWM duty ratio correction value (A) for the PTC heater is immediately calculated and the heat generation amount of the PTC heater 5 is rapidly corrected using the calculated PWM duty ratio correction value (A). It is therefore possible to rapidly cope with the abrupt change in the heat generation amount of the PTC heater 5 caused by the change in the air volume of the blower 9.

Since it is possible to rapidly cope with the abrupt change in the heat generation amount of the PTC heater 5 caused by the change in the air volume of the blower 9, the heat generation amount of the PTC heater 5 can be controlled in an optimal state before the ejection air temperature of the vehicle room is changed by the abrupt change in the heat generation amount of the PTC heater 5.

Since the heat generation amount of the PTC heater 5 can be controlled in an optimal state before the ejection air temperature of the vehicle room is changed, it is possible to keep constant the ejection air temperature of the vehicle room regardless of the change in the air volume of the blower 9 and the resultant change in the heat generation amount of the PTC heater 5.

Since the heat generation amount of the PTC heater 5 can be controlled in an optimal state before the ejection air temperature of the vehicle room is changed, unlike the prior art in which the heat generation amount of the PTC heater 5 is controlled after the ejection air temperature of the vehicle room is changed, it is possible to significantly increase the control speed of the heat generation amount of the PTC heater 5 and to sharply shorten the time required in controlling the heat generation amount of the PTC heater 5.

Since the time required in controlling the heat generation amount of the FTC heater 5 can be sharply shortened, it is possible to significantly improve the rapidity of control of the vehicle room temperature.

Since the heat generation amount of the PTC heater 5 is controlled in view of the air temperature as well as the change in the air volume of the blower 9, it is possible to accurately control the heat generation temperature of the PTC heater 5 and to greatly improve the comfort within the vehicle room.

Second Embodiment

Next, an air conditioning system for motor vehicles according to a second embodiment of the present invention will be described with reference to FIG. 3.

The air conditioning system according to the second embodiment includes the second memory unit 34 disposed in the control unit 7. The second memory unit 34 does not store the PWM duty ratio weight values associated with the air temperatures but stores the PWM duty ratio weight values associated with the PTC heater PWM duty ratios.

In the air conditioning system according to the second embodiment, if the air volume control signal S2 is inputted from the air volume change detection unit 20, the control unit 7 determines that the air volume of the blower 9 is currently changed and the heat generation amount of the PTC heater 5 is currently changed.

Upon making such determination, the control unit 7 enters a heater precedent control mode. In the heater precedent control mode, the control unit 7 detects, from the first memory unit 32 and the second memory unit 34, the PWM duty ratio compensation value corresponding to the blower air volume change amount per unit time measured in the blower air volume change amount measurement unit 30 and the PWM duty ratio weight value corresponding to the current PWM duty ratio of the PTC heater 5.

If the PWM duty ratio compensation value corresponding to the blower air volume change amount per unit time and the PWM duty ratio weight value corresponding to the current PWM duty ratio of the PTC heater 5 are detected, the control unit 7 calculates a PWM duty ratio correction value (A) using the following pre-stored equation [2]:

PWM duty ratio correction value ($A$)=PWM duty ratio compensation value ($B$) corresponding to blower air volume change amount per unit time×PWM duty ratio weight value ($D$) corresponding to PWM duty ratio of PTC heater.

If the calculation of the PWM duty ratio correction value (A) is completed, the control unit 7 applies the calculated PWM duty ratio correction value (A) to the PTC heater 5 and corrects the heat generation amount of the PTC heater 5.

Accordingly, it is possible to rapidly cope with the abrupt change in the heat generation amount of the PTC heater 5 caused by the change in the air volume of the blower 9. This makes it possible to appropriately control the heat generation amount of the PTC heater 5.

The second memory unit 34 of the control unit 7 stores the PWM duty ratio weight values in association with the PTC heater PWM duty ratios. The PWM duty ratio weight values associated with the PTC heater PWM duty ratios may be obtained by conducting experiments several times.

In this case, it is preferred that the PWM duty ratio weight values against the PTC heater PWM duty ratios stored in the second memory unit 34 are set to become gradually larger in proportion to the PTC heater PWM duty ratios.

The reason is as follows. The temperature of the PTC heater 5 becomes higher as the PTC heater PWM duty ratio grows larger. By setting the PWM duty ratio weight values so as to become gradually larger in proportion to the temperature of the PTC heater 5, the PWM duty ratio correction value (A) calculated by the equation [2] becomes gradually larger as the temperature of the PTC heater 5 grows higher. If the PWM duty ratio correction value (A) for the PTC heater 5 is allowed to become larger as the temperature of the PTC heater 5 grows higher, it is possible to cope with the high heating temperature of the PTC heater 5.

More preferably, the PWM duty ratio weight values against the PTC heater PWM duty ratios stored in the second memory unit 34 are set to become gradually larger in proportion to the PTC heater PWM duty ratios. In this case, only the PWM duty ratio weight values corresponding to the PTC heater PWM duty ratios equal to or larger than a predetermined reference PWM duty ratio are set to become gradually larger in proportion to the PTC heater PWM duty ratios. The PWM duty ratio weight values corresponding to the PTC heater PWM duty ratios smaller than the reference PWM duty ratio are set to become constant regardless of the PTC heater PWM duty ratios.

While some preferred embodiments of the present invention have been described above, the present invention is not limited to these embodiments. It is to be understood that various changes and modifications may be made without departing from the scope of the invention defined in the claims.

The invention claimed is:

1. An air conditioning system for motor vehicles, comprising:
   a blower configured to blow an air into a vehicle room;
   a PTC heater configured to heat the air blown into the vehicle room, the PTC heater having a heat generation amount adjusted by PWM duty ratio control;
   a blower air volume change amount measurement unit configured to measure a blower air volume change amount per unit time during a predetermined time period starting from a time point at which the air volume of the blower per unit time is initially changed; and
   a controller configured to correct a PWM duty ratio of the PTC heater in view of the blower air volume change amount per unit time measured by the blower air volume change amount measurement unit,
   wherein the controller is configured to receive an air volume control signal from an air volume change detection unit upon a determination that the air volume of the blower is changed per unit time,
   wherein the controller is configured to determine that the air volume of the blower has been changed per unit time and that the heat generation amount of the PTC heater is to be changed upon an inputting of the air volume control signal to the controller from the air volume change detection unit,
   wherein, upon the controller determining the air volume of the blower is changed per unit time, the controller is configured to enter a heater precedent control mode,
   wherein the heater precedent control mode includes the controller configured to detecting a PWM duty ratio compensation value corresponding to the blower air volume change per unit time measured by the blower air volume change amount measurement unit, and
   wherein the controller is configured to, upon the determination that the air volume of the blower is changed per unit time, correct the PWM duty ratio of the PTC heater in view of the blower air volume change amount per unit time and the PWM duty ratio of the PTC heater,
   wherein the controller is configured to set a first target heating temperature based on an ejection air temperature of a vehicle room inputted from an ejection air temperature detection sensor and applies a PWM duty ratio corresponding to the first target heating temperature to the PTC heater, thereby controlling the heat generation amount of the PTC heater, and
   wherein the controller is configured to, upon the determination that the air volume of the blower is changed per unit time, change the first target heating temperature to a second target heating temperature and control the heat generation amount of the PTC heater in conformity with the second target heating temperature before the ejection air temperature of the vehicle room is changed.

2. The air conditioning system of claim 1, wherein the controller is further configured to, upon the determination that the air volume of the blower is changed per unit time, correct the PWM duty ratio of the PTC heater in view of an air temperature of the air blown from the blower.

3. The air conditioning system of claim 2, wherein the controller is configured to store the PWM duty ratio compensation value corresponding to the blower air volume change amount per unit time and a PWM duty ratio weight value corresponding to the air temperature, and
   wherein the controller is configured to, upon the determination that the air volume of the blower is changed per unit time, detect the PWM duty ratio weight value, calculate a PWM duty ratio correction value from the PWM duty ratio compensation value and the PWM duty ratio weight value using a pre-stored equation: the PWM duty ratio correction value=the PWM duty ratio compensation value corresponding to the blower air volume change amount per unit time×the PWM duty ratio weight value corresponding to the air temperature, and correct the PWM duty ratio of the PTC heater using the PWM duty ratio correction value.

4. The air conditioning system of claim 1, wherein the controller is configured to store the PWM duty ratio compensation value corresponding to the blower air volume change amount per unit time and a PWM duty ratio weight value corresponding to the PWM duty ratio of the PTC heater, and
   the controller is configured to, upon the determination that the air volume of the blower is changed per unit time, detect the PWM duty ratio weight value, calculate a PWM duty ratio correction value from the PWM duty ratio compensation value and the PWM duty ratio weight value using a pre-stored equation: the PWM duty ratio correction value=the PWM duty ratio compensation value corresponding to the blower air volume change amount per unit time×the PWM duty ratio weight value corresponding to the PWM duty ratio of the PTC heater, and correct the PWM duty ratio of the PTC heater using the PWM duty ratio correction value.

5. The air conditioning system of claim 3, wherein the PWM duty ratio compensation value corresponding to the blower air volume change amount per unit time stored in the controller is configured to be differently set depending on whether the air volume of the blower is reduced or increased.

6. The air conditioning system of claim 5, wherein the PWM duty ratio compensation value corresponding to the blower air volume change amount per unit time stored in the controller is configured to be set to become gradually larger in proportion to a reduction of the air volume of the blower per unit time under a condition that the air volume of the blower per unit time is reduced, and is set to become gradually larger in proportion to an increase of the air volume of the blower per unit time under a condition that the air volume of the blower per unit time is increased.

7. The air conditioning system of claim 4, wherein the PWM duty ratio compensation value corresponding to the blower air volume change amount per unit time stored in the controller is configured to be differently set depending on whether the air volume of the blower per unit time is reduced or increased.

8. The air conditioning system of claim 7, wherein the PWM duty ratio compensation value corresponding to the blower air volume change amount per unit time stored in the controller is configured to be set to become gradually larger in proportion to a reduction of the air volume of the blower per unit time under a condition that the air volume of the blower per unit time is reduced, and is set to become gradually larger in proportion to an increase of the air volume of the blower per unit time under a condition that the air volume of the blower per unit time is increased.

9. The air conditioning system of claim 3, wherein the PWM duty ratio weight value corresponding to the air temperature stored in the controller is configured to be set to become gradually larger in reverse proportion to a reduction of the air temperature.

10. The air conditioning system of claim 4, wherein the PWM duty ratio weight value corresponding to the PWM duty ratio of the PTC heater stored in the controller is configured to be set to become gradually larger in proportion to increase of the PWM duty ratio of the PTC heater.

11. The air conditioning system of claim 10, wherein the PWM duty ratio weight value corresponding to the PWM duty ratio of the PTC heater is set to become gradually larger if the PWM duty ratio of the PTC heater is equal to or larger than a predetermined reference PWM duty ratio, and is set to become constant regardless of the PWM duty ratio of the PTC heater if the PWM duty ratio of the PTC heater is smaller than the reference PWM duty ratio.

12. The air conditioning system of claim 1, wherein the PWM duty ratio of the PTC heater is corrected only when the air volume of the blower is changed per unit time by one of manually adjusting a rotation speed level of the blower, changing an operation mode of the blower from a manual mode to an auto mode, or changing a preset temperature of a vehicle room in the auto mode.

13. The air conditioning system of claim 1, wherein if a predetermined time period is elapsed after the PWM duty ratio of the PTC heater is corrected pursuant to a change in the air volume of the blower per unit time, the controller is configured to return to an auto mode and control the PWM duty ratio of the PTC heater depending on the ejection air temperature of the air ejected into vehicle room.

* * * * *